United States Patent
Nagano

(10) Patent No.: US 10,901,735 B2
(45) Date of Patent: Jan. 26, 2021

(54) APPARATUS AND METHOD TO IMPROVE PERFORMANCE OF MEMORY ACCESSES FROM PLURAL ARITHMETIC PROCESSORS

(71) Applicant: FUJITSU LIMITED, Kawasaki (JP)

(72) Inventor: Tomohiro Nagano, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 16/295,450

(22) Filed: Mar. 7, 2019

(65) Prior Publication Data

US 2019/0278602 A1 Sep. 12, 2019

(30) Foreign Application Priority Data

Mar. 12, 2018 (JP) ................................ 2018-044761

(51) Int. Cl.
*G06F 9/30* (2018.01)
*G06F 9/38* (2018.01)

(52) U.S. Cl.
CPC ...... *G06F 9/30043* (2013.01); *G06F 9/30167* (2013.01); *G06F 9/3893* (2013.01)

(58) Field of Classification Search
None
See application file for complete search history.

(56) References Cited

U.S. PATENT DOCUMENTS

| | | | |
|---|---|---|---|
| 7,340,591 B1* | 3/2008 | Pechanek | G06F 9/30043 712/200 |
| 7,421,528 B1* | 9/2008 | Yin | H04L 12/56 370/390 |
| 8,549,256 B2* | 10/2013 | Narad | G06F 9/30145 712/3 |
| 9,294,386 B2* | 3/2016 | Narad | H04L 49/9031 |
| 2007/0274341 A1* | 11/2007 | Rodriguez | H04L 41/00 370/473 |
| 2009/0083522 A1* | 3/2009 | Boggs | G06F 9/30101 712/220 |
| 2011/0125946 A1 | 5/2011 | Demura et al. | |

(Continued)

FOREIGN PATENT DOCUMENTS

JP 2002-366507 12/2002
JP 2011-113119 6/2011

*Primary Examiner* — Hyun Nam
(74) *Attorney, Agent, or Firm* — Fujitsu Patent Center

(57) ABSTRACT

An apparatus includes a memory, a memory controller, arithmetic processors, and access circuits corresponding to the arithmetic processors. The memory controller controls a load instruction that reads, from the memory, data to be obtained by the arithmetic processors. The access circuit generates divided instructions by dividing a multicast load instruction, and selects, for each divided instruction, a first access circuit that issues, to the memory controller, a read request for causing the target access circuits to perform responses to the target access arithmetic processors. The first access circuit determines first identification information common to all the target access circuits, and issues, to the memory controller, a single read request to which the first identification information is added, and obtains, from the memory controller, responses to which the first identification information is added, and outputs first data based on the obtained responses to the target arithmetic processors.

10 Claims, 14 Drawing Sheets

(56) References Cited

U.S. PATENT DOCUMENTS

| | | | |
|---|---|---|---|
| 2013/0083796 A1* | 4/2013 | Matthews | H04L 49/201 370/390 |
| 2013/0159449 A1* | 6/2013 | Taylor | G06F 9/544 709/212 |
| 2014/0040671 A1* | 2/2014 | Akirav | G06F 11/0778 714/45 |

* cited by examiner

FIG. 3

| COMMAND [7:0] | STARTING ADDRESS [7:0] | DATA LENGTH [7:0] | DESTINATION [7:0] |

| INSTRUCTION | | | | | | | | | | MEMORY ACCESS | | | | | | | | | | | | | | | | | | REGISTER CONTROL | | | | | | | | |
|---|---|---|---|---|---|---|---|---|---|---|---|---|---|---|---|---|---|---|---|---|---|---|---|---|---|---|---|---|---|---|---|---|---|---|---|
| INSTRUCTION VALUE | TARGET LOAD STORE UNIT | | | | | | | | MEMORY ACCESS RIGHT | REQUEST ID | SELECTED LSU | | | | | | | | COMPLETION RECEIVING LSU | | | | | | | | WRITE REQUEST ISSUING LSU | | | | | | | | |
| | #1 | #2 | #3 | #4 | #5 | #6 | #7 | #8 | | | #1 | #2 | #3 | #4 | #5 | #6 | #7 | #8 | #1 | #2 | #3 | #4 | #5 | #6 | #7 | #8 | #1 | #2 | #3 | #4 | #5 | #6 | #7 | #8 |
| LOAD LD1 (512 Bytes) | ● | | | | | | | | READ 1-01 | 00 | ● | | | | | | | | | | | | | | | | | | | | | | | |
| LOAD LD2 (256 Bytes) | | ● | | | | | | | READ 1-02 | 01 | ● | | | | | | | | ● | | | | | | | | ● | | | | | | | |
| LOAD LD3 (4 KBytes) | | ● | ● | ● | ● | ● | ● | ● | READ 2-01 | 00 | | ● | | | | | | | ● | | | | | | | | ● | | | | | | | |
| | | | | | | | | | READ 3-01 | 00 | ● | | | | | | | | | ● | | | | | | | | ● | | | | | | |
| | | | | | | | | | READ 3-02 | 01 | ● | ● | | | | | | | ● | ● | | | | | | | ● | ● | | | | | | |
| | | | | | | | | | READ 3-03 | 02 | ● | ● | ● | | | | | | ● | ● | ● | | | | | | ● | ● | ● | | | | | |
| | | | | | | | | | READ 3-04 | 03 | ● | ● | ● | ● | | | | | ● | ● | ● | ● | | | | | ● | ● | ● | ● | | | | |
| | | | | | | | | | READ 3-05 | 04 | ● | ● | ● | ● | ● | | | | ● | ● | ● | ● | ● | | | | ● | ● | ● | ● | ● | | | |
| | | | | | | | | | READ 3-06 | 05 | ● | ● | ● | ● | ● | ● | | | ● | ● | ● | ● | ● | ● | | | ● | ● | ● | ● | ● | ● | | |
| | | | | | | | | | READ 3-07 | 06 | ● | ● | ● | ● | ● | ● | ● | | ● | ● | ● | ● | ● | ● | ● | | ● | ● | ● | ● | ● | ● | ● | |
| | | | | | | | | | READ 3-08 | 07 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-09 | 08 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-10 | 09 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-11 | 10 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-12 | 11 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-13 | 12 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-14 | 13 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-15 | 14 | ● | ● | ● | ● | ● | ● | ● | ● | ● | ● | ● | ● | ● | ● | ● | ● | ● | ● | ● | ● | ● | ● | ● | ● |
| | | | | | | | | | READ 3-16 | 15 | ● | ● | ● | ● | ● | ● | ● | ● | ● | ● | ● | ● | ● | ● | ● | ● | ● | ● | ● | ● | ● | ● | ● | ● |
| LOAD LD4 (256 Bytes) | ● | | | | | | | | READ 4-01 | 00 | ● | | | | | | | | ● | | | | | | | | ● | | | | | | | |
| LOAD LD5 (1 KByte) | | ● | ● | ● | | | | | READ 5-01 | 00 | ● | | | | | | | | ● | ● | ● | ● | | | | | ● | ● | ● | ● | | | | |
| | | | | | | | | | READ 5-02 | 01 | ● | | | | | | | | ● | ● | ● | ● | | | | | ● | ● | ● | ● | | | | |
| | | | | | | | | | READ 5-03 | 02 | ● | | | | | | | | ● | ● | ● | ● | | | | | ● | ● | ● | ● | | | | |
| | | | | | | | | | READ 5-04 | 03 | ● | | | | | | | | ● | ● | ● | ● | | | | | ● | ● | ● | ● | | | | |

FIG. 12

APPARATUS AND METHOD TO IMPROVE PERFORMANCE OF MEMORY ACCESSES FROM PLURAL ARITHMETIC PROCESSORS

CROSS-REFERENCE TO RELATED APPLICATION

This application is based upon and claims the benefit of priority of the prior Japanese Patent Application No. 2018-44761, filed on Mar. 12, 2018, the entire contents of which are incorporated herein by reference.

FIELD

The embodiments discussed herein are related to apparatus and method to improve performance of memory accesses from plural arithmetic processors.

BACKGROUND

A multi-core arithmetic apparatus in which a memory functioning as a main storage device and a memory access controller (MAC) unit are coupled to a plurality of cores in a one-to-many manner has been proposed. Each of the cores includes an instruction unit (IU), a load/store unit, a register file, and an execution unit (EU). In a case where the number of mounted cores is high, in particular, for example, an access bus to the main memory is shared among the plurality of cores for convenience in terms of circuit implementation in some cases.

The instruction unit issues a load/store instruction serving as a read or write command of data with respect to the memory to the load/store unit. The load/store unit performs read or write of the data with respect to the memory in accordance with the issued load/store instruction. The register file stores the obtained data. The execution unit performs a computation by using the data stored in the register file.

In particular, for example, operations of the instruction unit and the load/store unit in the case of the data read will be described in detail. The instruction unit decodes a load instruction transmitted from software. The instruction unit instructs the load/store unit to execute the load instruction. The load/store unit divides the load instruction in units of the memory access. For example, the load/store unit divides the load instruction into 256 Bytes each. Next, the load/store unit assigns a request identifier (ID) to each division unit of the load instruction and also acquires a data buffer area in a buffer of the MAC unit. Thereafter, the load/store unit issues a memory read request to the MAC unit by placing the request ID on each of the divided load instructions.

Thereafter, the load/store unit receives a memory read completion corresponding to a response to the memory read request from the MAC unit. The load/store unit stores memory read data attached to the received memory read completion in its own data buffer. Next, the load/store unit reads the memory read data from the data buffer and transmits the memory read data together with a write request in which a destination register is described to the register file. The load/store unit releases the request ID and the data buffer. The load/store unit performs this operation with regard to all the divided load/store instructions. After the above-mentioned operation is performed with regard to all the divided load/store instructions, the load/store unit issues a completion notification of the load instruction to the instruction unit. It is noted however that it is not guaranteed that the load/store unit receives the memory read completions corresponding to the responses in the order of the memory read requests.

The load/store unit may issue a subsequent memory read request to a port of the MAC unit without waiting for a response to one memory read request. At this time, between the load/store unit and the port of the MAC unit, control is performed such that a specified number or more of requests are not to be issued to the port of the MAC unit under flow control. The specified number is determined depending on the number of stages of request reception buffers arranged for each port of the MAC unit.

In a case where the same memory data is loaded into a plurality of register files corresponding to a plurality of execution units, it is conceivable that the respective load/store units respectively independently issue the memory read requests to the MAC unit. The MAC unit performs the read operation the number of times equivalent to the number of memory read requests with respect to the same memory area. In this case, the MAC unit repeats the same operation and keeps processing of a subsequent instruction waiting during this period of time. The load instruction corresponds to the load in which the plurality of register files respectively corresponding to the plurality of execution units are specified at once as the storage destinations in some cases. Hereinafter, the load in which the plurality of register files respectively corresponding to the plurality of execution units are specified at once as the storage destinations will be referred to as a "multicast load". The MAC unit and the load/store unit correspond to the memory read request serving as data readout to the plurality of register files corresponding to the plurality of execution units in some cases.

In the multicast load, one representative single load/store unit of the plurality of load/store units issues the memory read request to the MAC unit. Thereafter, all the load/store units set as the targets of the multicast load receive the memory read completion and then issue the write request to the register file. For this configuration, all the load/store units set as the targets of the multicast load preferably associate the memory read request issued by the representative load/store unit with the received memory read completion. As one of the methods, a method of waiting for release of all of the request IDs that may be used in all the load/store units set as the targets of the multicast load and obtaining the request ID of the same memory read request with respect to the multicast load instruction has been proposed.

A related-art technology has been proposed in which, in a case where memory access is performed from the plurality of devices or a case where DMA access is performed, the data to be accessed is divided to be assigned with an access priority on a round-robin basis.

Japanese Laid-open Patent Publication No. 2011-113119 and Japanese Laid-open Patent Publication No. 2002-366507 discuss related art technologies, for example.

SUMMARY

According to an aspect of the embodiments, an apparatus includes a memory, a memory controller, arithmetic processors, and access circuits corresponding to the arithmetic processors. The memory controller controls a load instruction that reads, from the memory, data to be obtained by the arithmetic processors. The access circuit generates divided instructions by dividing a multicast load instruction, and selects, for each divided instruction, a first access circuit that issues, to the memory controller, a read request for causing the target access circuits to perform responses to the target access arithmetic processors. The first access circuit determines first identification information common to all the target access circuits, and issues, to the memory controller, a single read request to which the first identification information is added, and obtains, from the memory controller, responses to which the first identification information is added, and outputs first data based on the obtained responses to the target arithmetic processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a format of a load instruction;

FIG. 11 illustrates a processing state of a multicast load instruction of a related-art information processing apparatus;

FIG. 12 illustrates a processing state of the multicast load instruction of the information processing apparatus according to the first embodiment;

DESCRIPTION OF EMBODIMENTS

In a case where the multicast load instruction is executed, since the respective load/store units are synchronized for a purpose of unification of the request IDs, the multicast load instruction is suspended until the preceding instruction is completed. For this reason, there is a fear that a throughput of a memory data transfer may be decreased. A bias occurs in a selection of the representative load/store unit that issues a multicast read request. The number of read requests that may be issued by the single load/store unit at once is restricted by the number of stages of the request reception buffers in the MAC unit. In a case where the multicast read request is issued, many request reception buffers corresponding to the representative load/store unit are used, but a use rate of the request reception buffers corresponding to the other load/store unit is decreased. Since a bias occurs in use statuses of the request reception buffers in this manner, a bias occurs among the load/store units, and there is a fear that the throughput of the memory data transfer may be decreased as a result. Since processing performance of the multi-core arithmetic apparatus depends on a magnitude of the throughput of the memory data transfer, according to the related-art execution method for the multicast load instruction, it is difficult to improve the processing performance of the multi-core arithmetic apparatus.

According to the related-art technology for dividing the data to be accessed and assigning the access priorities on the round-robin basis, the unification of the request IDs is not taken into account, and there is a fear that the throughput may be decreased in a case where the multicast load instruction is executed. For this reason, even with those related-art technologies used, it is difficult to improve the processing performance of the multi-core arithmetic apparatus.

It is preferable to improve the processing performance.

Hereinafter, embodiments of an information processing apparatus, an arithmetic processing apparatus, and a control method for the information processing apparatus disclosed in the present application will be described in detail with reference to the drawings. The information processing apparatus, the arithmetic processing apparatus, and the control method for the information processing apparatus disclosed in the present application are not intended to be limited by the following embodiments.

First Embodiment

Figure 1:
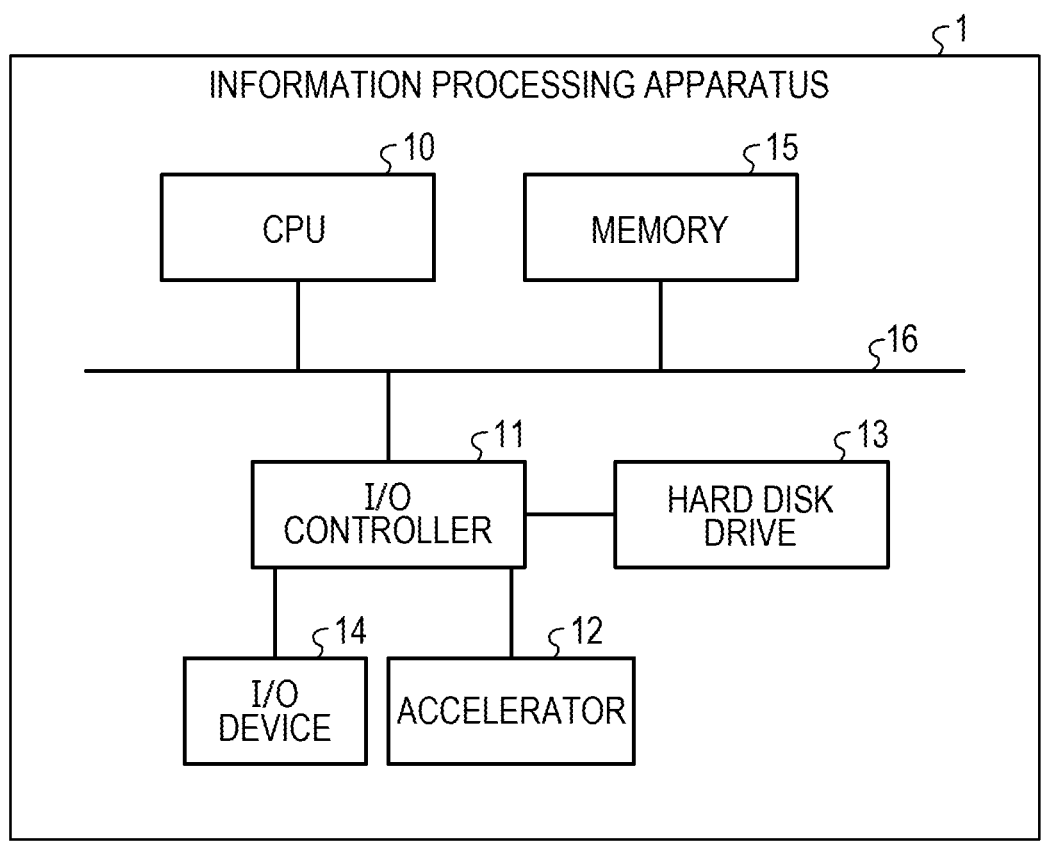
FIG. 1 illustrates an example of a hardware configuration of an information processing apparatus.

FIG. 1 illustrates an example of a hardware configuration of an information processing apparatus. As illustrated in FIG. 1, an information processing apparatus 1 includes a central processing unit (CPU) 10, an input/output (I/O) controller 11, an accelerator 12, a hard disk drive 13, an I/O device 14, and a memory 15.

The I/O controller 11 is connected to the accelerator 12, the hard disk drive 13, and the I/O device 14. The I/O device 14 refers to an I/O device other than the accelerator 12 and the hard disk drive 13. The I/O controller 11 controls the accelerator 12, the hard disk drive 13, and the I/O device 14 in response to the instruction from the CPU 10. The I/O controller 11 relays a communication between the accelerator 12, the hard disk drive 13, and the I/O device 14 and the CPU 10.

The CPU 10 functioning as the arithmetic processing apparatus are coupled to the I/O controller 11 and the memory 15 via a bus 16. The CPU 10 may perform data transmission and reception with the memory 15. The CPU 10 may perform data transmission and reception with the accelerator 12, the hard disk drive 13, and the I/O device 14 via the I/O controller 11.

The hard disk drive 13 stores various programs such as an operating system (OS) and various applications.

The CPU 10 reads the program from the hard disk drive 13 to be stored in the memory 15 and executed to operate the OS and the various applications. The applications include, for example, an application for executing deep learning or the like.

The CPU 10 causes the accelerator 12 to perform particular processing when the application is to be executed. For example, the CPU 10 causes the accelerator 12 to perform arithmetic processing in deep learning or the like. Specifically, for example, software executed by the CPU 10 transmits an arithmetic instruction together with data used for the computation to the accelerator 12 via the I/O controller 11.

Figure 2:
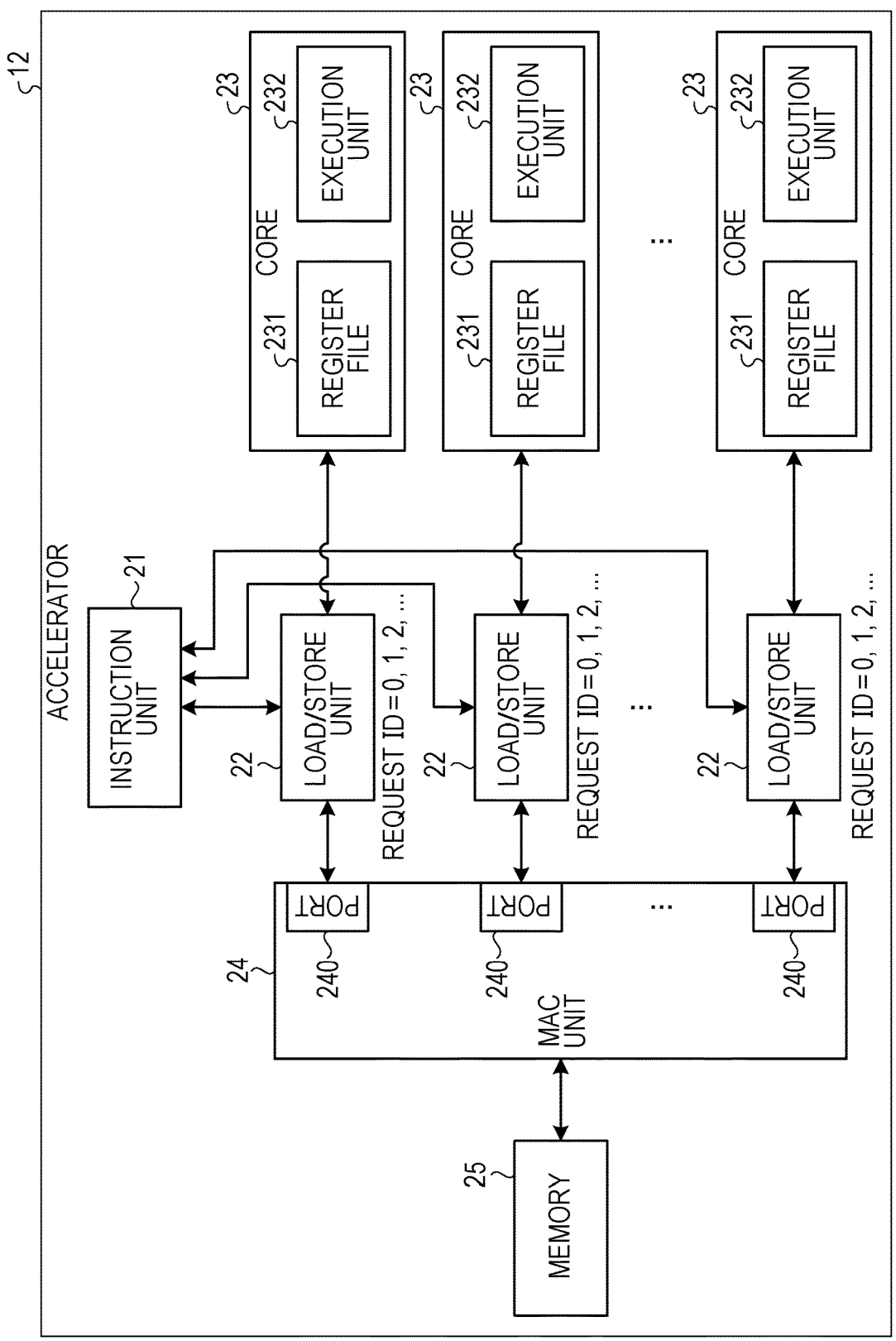
FIG. 2 is a block diagram of an accelerator according to a first embodiment.

FIG. 2 is a block diagram of an accelerator 12 according to a first embodiment. As illustrated in FIG. 2, the accelerator 12 includes an instruction unit 21, load/store units 22, cores 23, a MAC unit 24, and a memory 25. The accelerator 12 corresponds to an example of the "arithmetic processing apparatus".

A core 23 includes a register file 231 and an execution unit 232. According to the embodiment, the cores 23 correspond to the load/store units 22, respectively, on a one-on-one basis. A register file 231 receives memory read data read from the memory 25 from the corresponding load/store unit 22 to be stored therein. An execution unit 232 executes the computation by using the memory read data stored in the register file 231. The core 23 corresponds to an example of an "arithmetic processor". The register file 231 corresponds to an example of a "second memory".

The instruction unit 21 obtains the load instruction issued from the software executed by the CPU 10 for example. The load instruction obtained by the instruction unit 21 includes a format 301 of FIG. 3, for example. FIG. 3 illustrates an example of a format of the load instruction. In this case, the load instruction includes a command representing a type of the instruction, a starting address of the memory 25 corresponding to a target of the loading, a data length of the data, and a destination of the loaded data. Numbers in brackets described in the respective areas of the format 301 represent the number of bits of the areas.

In a case where the load instruction is a multicast load instruction, a plurality of cores 23 are registered as destinations. In contrast to this, in a case where the load instruction is a unicast load instruction, the single core 23 is registered as the destination.

Thereafter, the instruction unit 21 decodes the load instruction. The instruction unit 21 outputs the decoded load instruction to the load/store unit 22 connected to the core 23 specified as the destination of the load instruction. As a result of the decoding by the instruction unit 21, in a case where the decoded instruction is the multicast load instruction, the instruction unit 21 issues the multicast load instruction to the plurality of load/store units 22. The instruction unit 21 corresponds to an example of an "instruction output circuit".

The load/store units 22 are arranged so as to respectively correspond to the plurality of cores 23. The load/store unit 22 is connected to each of the corresponding cores 23. The load/store unit 22 is connected to a port 240 of the MAC unit 24. The load/store unit 22 corresponds to an example of an "access circuit".

Figure 4:
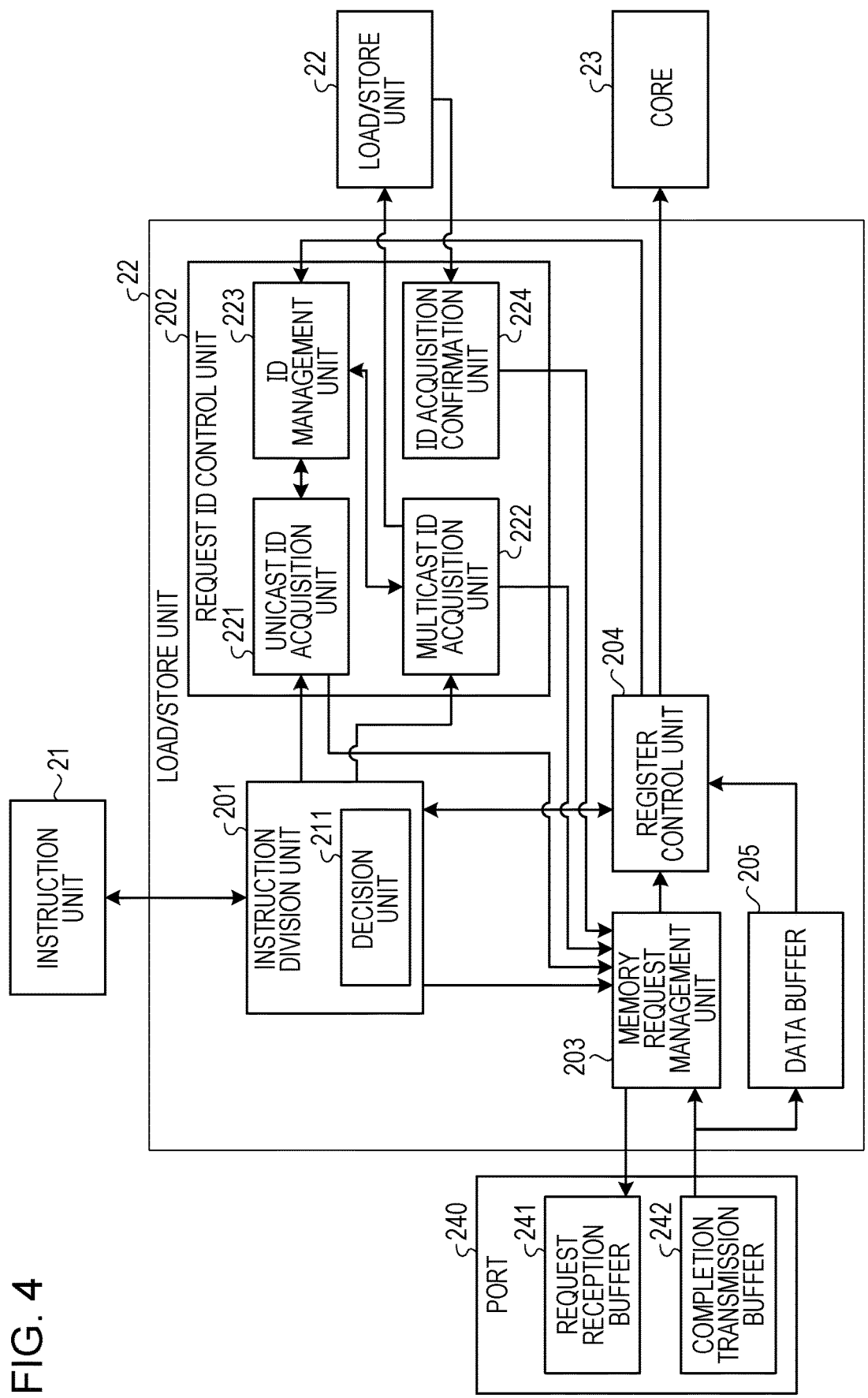
FIG. 4 is a block diagram illustrating a detail of a load/store unit.

Next, the load/store unit 22 will be described with reference to FIG. 4. FIG. 4 is a block diagram illustrating a detail of the load/store unit. As illustrated in FIG. 4, the load/store unit 22 includes an instruction division unit 201, a request ID control unit 202, a memory request management unit 203, a register control unit 204, and a data buffer 205.

The instruction division unit 201 includes a decision unit 211. The instruction division unit 201 obtains the load instruction issued from the instruction unit 21. The instruction division unit 201 divides the obtained load instruction into units of the memory access. According to the present embodiment, a case will be described as an example where memory access is performed in units of 256 Bytes. Hereinafter, the load instructions divided by 256 Bytes each corresponding to the units of the memory access will be referred to as "divided load instructions".

The instruction division unit 201 notifies the decision unit 211 of the destination in the load instruction. The decision unit 211 determines whether the destinations are the plurality of cores 23 or the destination is the single core 23.

In a case where the destination is the single core 23, the decision unit 211 decides that the load/store unit 22 in which its own unit is mounted in all the divided load instructions is the selected load/store unit 22 that performs the issuance of the memory read request. Hereinafter, the selected load/store unit 22 that performs the issuance of the memory read request will be referred to as the "selected load/store unit 22". Thereafter, the instruction division unit 201 instructs a unicast ID acquisition unit 221 of the request ID control unit 202 to obtain the request ID for each of the divided load instructions. The instruction division unit 201 sequentially issues the respective divided load instructions to the memory request management unit 203. The instruction division unit 201 outputs the information of the respective divided load instructions to the register control unit 204.

In contrast to this, in a case where the destinations are the plurality of cores 23, the decision unit 211 decides the selected load/store unit 22 in each of the divided load instructions from among the load/store units 22 connected to the core 23 at the destination. Hereinafter, the load/store unit 22 connected to the core 23 at the destination, that is, for example, the load/store unit 22 to which the multicast load instruction has been issued will be referred to as the "target load/store unit 22" since the load/store unit 22 is the target where the multicast load/store instructions are executed.

Specifically, for example, the decision unit 211 previously stores an issuance handling decision logic in which the same load/store unit 22 is decided in all the target load/store units 22 as the selected load/store unit 22 with respect to each of the divided load instructions. The decision unit 211 decides the selected load/store unit 22 in each of the divided load instructions by using the previously decided issuance handling decision logic.

For example, the decision unit 211 previously stores identification numbers assigned to all the load/store units 22 mounted to the accelerator 12. The decision unit 211 sequentially assigns the selected load/store unit 22 from among the target load/store units 22 in the order from the beginning of the divided load instruction in the ascending order of the identification numbers. With this configuration, each of the decision units 211 in all the target load/store unit 22 may select the same load/store unit 22 as the selected load/store unit 22 with regard to the respective divided load instructions. The decision unit 211 corresponds to an example of a "selection unit".

A case will be described as an example where eight load/store units 22 including load/store units #1 to #8 are arranged, and divided load instructions ##01 to ##04 are prepared. For example, in a case where the load/store unit #1 selects itself as the selected load/store unit 22 with respect to the divided load instruction ##01, the other load/store units #2 to #8 also select the load/store unit #1 as the selected load/store unit 22. With respect to the next divided load instruction ##02, in a case where the load/store unit #1 selects the load/store unit #2 as the selected load/store unit 22, the other load/store units #2 to #8 also select the load/store unit #2 as the selected load/store unit 22. With respect to the next divided load instruction ##03, in a case where the load/store unit #1 selects the load/store unit #3 as the selected load/store unit 22, the other load/store units #2 to #8 also select the load/store unit #3 as the selected load/store unit 22. With respect to the next divided load instruction ##04, in a case where the load/store unit #1 selects the load/store unit #4 as the selected load/store unit 22, the other load/store units #2 to #8 also select the load/store unit #4 as the selected load/store unit 22.

Thereafter, the instruction division unit 201 instructs a multicast ID acquisition unit 222 of the request ID control unit 202 to obtain the request ID for each of the divided load instructions together with the information of the selected load/store unit 22 with respect to each of the divided load instructions obtained by dividing the load instruction. The instruction division unit 201 sequentially issues each of the divided load instructions obtained by dividing the multicast load instruction to the memory request management unit 203 and the register control unit 204. The instruction division unit 201 outputs information for identify the divided load instruction where the load/store unit 22 where its own unit is mounted is set as the selected load/store unit 22 to the register control unit 204.

Thereafter, the instruction division unit 201 receives the completion notification with respect to each of the divided load instructions from the register control unit 204. After the completion notification of all the divided load instructions is obtained, the instruction division unit 201 issues the completion notification of the load instruction to the instruction unit 21.

The request ID control unit 202 performs the issuance of the request IDs with respect to the respective divided load instructions and the check on the acquisition of the request ID in the other load/store unit 22 respectively. The request ID control unit 202 includes the unicast ID acquisition unit 221, the multicast ID acquisition unit 222, an ID management unit 223, and an ID acquisition confirmation unit 224.

The ID management unit 223 manages use statuses of the requests ID with regard to the previously decided number of request IDs. Specifically, for example, in a case where the request ID is assigned to the particular divided load instruction by the unicast ID acquisition unit 221 or the multicast ID acquisition unit 222, the ID management unit 223 determines that the request ID is currently used. In a case where the notification of the request ID assigned to the divided load instruction where the processing is completed is received from the register control unit 204, the ID management unit 223 releases the notified request ID and sets the request ID to be unused.

The ID management unit 223 receives a notification request of an unused request ID the unicast ID acquisition unit 221. The ID management unit 223 notifies the unicast ID acquisition unit 221 of an appropriate request ID from among the unused request IDs.

The ID management unit 223 receives a notification request of a use status of the particular request ID from the multicast ID acquisition unit 222. The ID management unit 223 notifies the multicast ID acquisition unit 222 that the request ID that has received notification request is unused or currently used.

The ID management unit 223 includes a buffer including a predetermined number of storage areas to which numbers are assigned on a sequential number basis, a flip-flop, or the like. For example, the ID management unit 223 includes the storage areas to which numbers including 1 to 15 are assigned. In a case where the request IDs having the respectively assigned numbers are acquired by the unicast ID acquisition unit 221 or the multicast ID acquisition unit 222, the respective storage areas of the ID management unit 223 are set as the used request IDs by turning on a flag. The numbers assigned to the storage areas where the flag is off in the storage areas of the ID management unit 223 correspond to the unused request IDs. That is, for example, the ID management unit 223 performs the notification that the request ID having the number assigned to the storage area is currently used or unused based on the statuses of the flags of the respective storage areas.

In a case where the load instruction is the unicast load instruction, the unicast ID acquisition unit 221 sequentially receives the instruction for obtaining the request ID for each of the divided load instructions from the instruction division unit 201. The unicast ID acquisition unit 221 performs the notification request of the unused request ID with respect to the ID management unit 223 in the order from the beginning of the divided load instruction. The unicast ID acquisition unit 221 sequentially performs processing which will be described below with respect to the respective divided load instructions. Hereinafter, the processing of the unicast ID acquisition unit 221 will be described while the particular divided load instruction is used as an example.

The unicast ID acquisition unit 221 acquires the request ID of the divided load instruction from among the unused request IDs notified from the ID management unit 223. The unicast ID acquisition unit 221 notifies the memory request management unit 203 of the acquired request ID as the request ID assigned to the divided load instruction. As described above, the unicast ID acquisition unit 221 performs the acquisition processing of the request ID with respect to all the divided load instructions.

In a case where the load instruction is the multicast load instruction, the multicast ID acquisition unit 222 receives the instruction for obtaining the request ID for each of the divided load instructions together with the information of the selected load/store unit 22. The multicast ID acquisition unit 222 sequentially performs the processing which will be described below with respect to the respective divided load instructions. Hereinafter, the processing of the multicast ID acquisition unit 222 will be described while the particular divided load instruction is used as an example.

The multicast ID acquisition unit 222 previously stores a request ID decision logic in which the same request ID is acquired as the request ID with respect to the divided load instruction in all the target load/store units 22. The multicast ID acquisition unit 222 decides the request ID to be assigned to the divided load instruction by using the previously decided request ID decision logic. That is, for example, the respective target load/store units 22 decide the same request ID with respect to the divided load instructions having the same source. For example, the multicast ID acquisition unit 222 stores a logic in which the request IDs of the respective divided load instructions are set as the sequent numbers in the ascending order among the requests ID as the request ID decision logic.

A case will be described where the numbers used as the request IDs are 0 to 15. The multicast ID acquisition unit 222 in each of the target load/store units 22 decides the first request ID of the divided load instruction as 0 and decides the next request ID of the divided load instruction as 1. In a case where the number of the divided load instructions exceeds 15, the multicast ID acquisition unit 222 repeats the assignment by circulating the numbers. In FIG. 2, the request IDs described below the respective load/store units 22 represent that each of the load/store units 22 is sequentially decided as the request ID from the left of the numbers arranged with respect to the respective divided load instructions.

Figure 5:
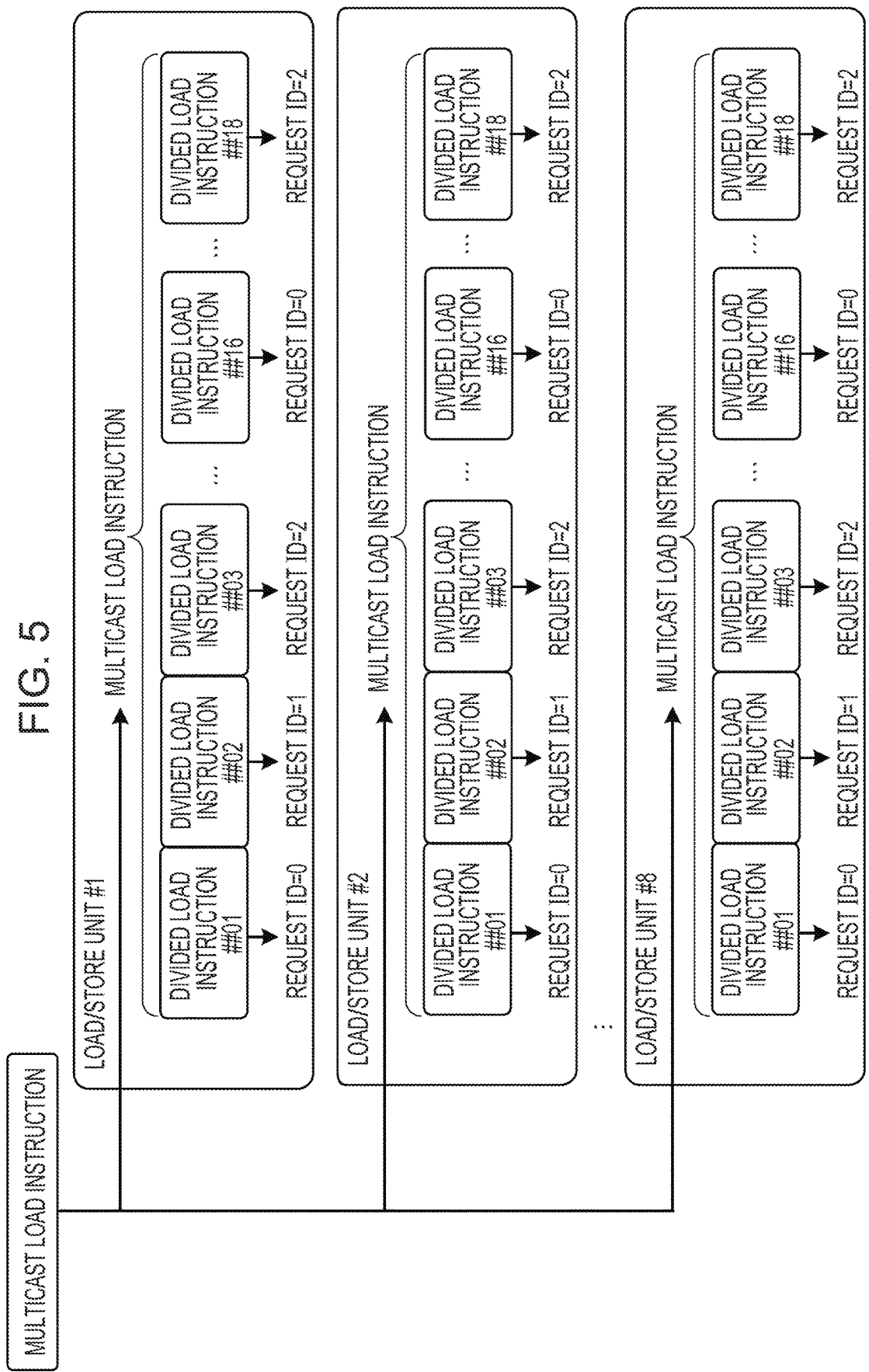
FIG. 5 is an explanatory diagram for describing a decision of a request ID.

For example, the decision on the request IDs in the load/store units #1 to #8 functioning as the target load/store units 22 will be further described with reference to FIG. 5. FIG. 5 is an explanatory diagram for describing a decision of the request ID. A case will be described where the divided load instructions ##01 to ##18 are prepared, and the numbers used as the request IDs are 0 to 15. As illustrated in FIG. 5, it is assumed that a multicast load instruction is issued to the load/store units #1 to #8. In this case, when each of the load/store units #1 to #8 generates the divided load instruction ##01, the same request ID=0 is issued with respect to the same divided load instruction ##01. When each of the load/store units #1 to #8 generates the divided load instruction ##02, the same request ID=1 is issued with respect to the same divided load instruction ##02. When each of the load/store units #1 to #8 generates the divided load instruction ##03, the same request ID=2 is issued with respect to the same divided load instruction ##03. Thereafter, the load/store units #1 to #8 repeat the decision on the request ID. When each of the load/store units #1 to #8 generates the divided load instruction ##16, the request ID is returned to 0, and the same request ID=0 is issued with respect to the same divided load instruction ##16. Finally, when each of the load/store units #1 to #8 generates the divided load instruction ##18, the same request ID=2 is issued with respect to the same divided load instruction ##18.

Referring again to FIG. 4, the multicast ID acquisition unit 222 checks the ID management unit 223 as to whether the request ID where the assignment is decided with respect to the divided load instruction is currently used or unused. When the request ID is currently used, the multicast ID acquisition unit 222 stands by until the target request ID becomes unused. In contrast to this, when the target request ID is unused, the multicast ID acquisition unit 222 acquires the request ID to be assigned to the divided load instruction.

The number of divided load instructions obtained by dividing the multicast load instruction depends on the memory data amount of the multicast load instruction. The number of request IDs depends on hardware resources. For this reason, the number of divided load instructions may exceed the number of request IDs that may be assigned in some cases. In such a case, the multicast ID acquisition unit 222 uses the same request ID plural times with respect to the single multicast load instruction. In the above-mentioned case too, the request ID used in the previous divided load instruction is set to be currently used, and the multicast ID acquisition unit 222 stands by for the issuance of the request ID until the confirmation that the request ID used in the previous divided load instruction becomes unused is received from the ID management unit 223.

Thereafter, the multicast ID acquisition unit 222 issues the request ID assigned to the divided load instruction to the memory request management unit 203. The multicast ID acquisition unit 222 notifies the memory request management unit 203 of the request ID irrespective of whether or not the load/store unit 22 in which its own unit is mounted is the selected load/store unit 22. In a case where the load/store unit 22 in which its own unit is mounted is not the selected load/store unit 22 in the divided load instruction, the multicast ID acquisition unit 222 notifies the selected load/store unit 22 of the acquisition of the request ID. As described above, the multicast ID acquisition unit 222 performs the acquisition processing of the request ID with respect to all the divided load instructions.

The ID acquisition confirmation unit 224 receives the notification of the acquisition completion of the request ID from the other load/store unit 22 with respect to the divided load instruction where the load/store unit 22 in which its own unit is mounted is the selected load/store unit 22. When the notification of the acquisition completion of the request ID is received from all the other load/store units 22, the ID acquisition confirmation unit 224 transmits the acquisition completion notification of the request ID by all the other target load/store units 22 to the memory request management unit 203.

In a case where the load instruction is the unicast load instruction, the memory request management unit 203 receives the inputs of all the divided load instructions from the instruction division unit 201. The memory request management unit 203 receives the input of the request ID assigned to each of the divided load instructions from the unicast ID acquisition unit 221. The memory request management unit 203 generates a unicast read request corresponding to each of the divided load instructions.

In this case, the memory request management unit 203 adds the request ID assigned to the divided load instruction to the unicast read request. The memory request management unit 203 registers the load/store unit 22 in which its own unit is mounted in the destination field of the response in the unicast read request.

Thereafter, the memory request management unit 203 secures a data buffer area in a request reception buffer 241 of the MAC unit 24 which will be described below. In a case where the data buffer area does not remain in the request reception buffer 241, the memory request management unit 203 stands by until the data buffer area in the request reception buffer 241 becomes free. The memory request management unit 203 secures the freed-up data buffer area in the request reception buffer 241. Thereafter, the memory request management unit 203 issues the generated unicast read request to the request reception buffer 241 to be stored in the secured data buffer area.

Thereafter, the memory request management unit 203 obtains a header of a memory read completion corresponding to a response to the unicast read request from a completion transmission buffer 242 of the port 240 which will be described below. The memory request management unit 203 identifies the divided load instruction to which the request ID stored in the respective obtained memory read completions is assigned. Thereafter, the memory request management unit 203 transmits information of the identified divided load instruction and the request ID assigned to the divided load instruction to the register control unit 204.

On the other hand, in the case of the multicast load instruction, the memory request management unit 203 receives the inputs of all the divided load instructions from the instruction division unit 201. The memory request management unit 203 receives the input of the request ID assigned to each of the divided load instructions from the multicast ID acquisition unit 222. With this configuration, the memory request management unit 203 obtains correspondence information between the divided load instruction and the request ID.

The memory request management unit 203 receives the input of the information representing that the load/store unit 22 in which its own unit is mounted is the divided load instruction of the selected load/store unit 22 from the instruction division unit 201. The memory request management unit 203 receives the input of the acquisition completion notification of the particular request ID by all the other target load/store units 22 from the ID acquisition confirmation unit 224. This particular request ID is the request ID assigned to the divided load instruction where the load/store unit 22 in which its own unit is mounted is the selected load/store unit 22. Thereafter, the memory request management unit 203 generates a multicast read request corresponding to the divided load instruction where the load/store unit 22 in which its own unit is mounted is the selected load/store unit 22.

Figure 6:
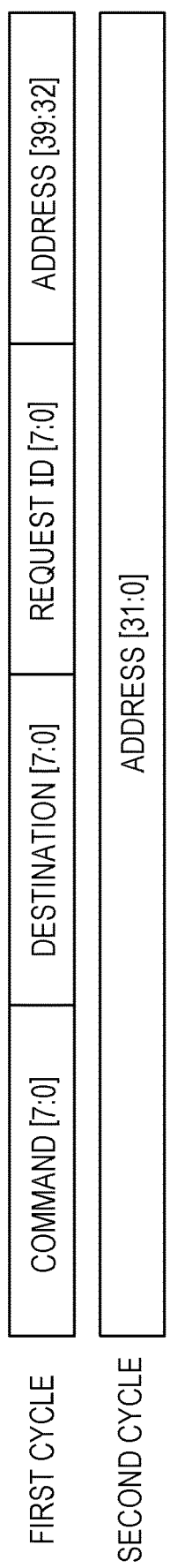
FIG. 6 illustrates an example of a format of a multicast read request.

FIG. 6 illustrates an example of a format of the multicast read request. The multicast read request generated by the memory request management unit 203 illustrated in FIG. 4 has a format 302 illustrated in FIG. 6. With regard to the multicast read request, a command indicating a type of the request, a destination indicating the transmission destination of the read data, an assigned request ID, and a data read address are registered. For example, the command, the destination and the request ID are transmitted in a first cycle. The address is transmitted in the first cycle and a second cycle.

Referring again to FIG. 4, for example, the memory request management unit 203 registers a read command corresponding to a data read command in the multicast read request as a command. The memory request management unit 203 registers the load/store unit 22 specified as the destination in the load instruction, that is, for example, the target load/store unit 22 in the multicast read request as the destination. The memory request management unit 203 registers the assigned request ID in the divided load instruction corresponding to the multicast read request as the request ID of the multicast read request. The memory request management unit 203 registers a starting address of the data read in the multicast read request. In this case, since the data length is the unit of the memory access, the memory request management unit 203 may avoid registering the data length in the multicast read request in some cases. It is noted however that the data length where the data is shorter than the unit of the memory access may be read in the first or last divided load instruction in some cases, and in the above-mentioned case, the memory request management unit 203 may register information indicating the data length or the like after the starting address.

Thereafter, the memory request management unit 203 secures the data buffer area in the request reception buffer 241 of the MAC unit 24. In a case where the data buffer area does not remain in the request reception buffer 241, the memory request management unit 203 stands by until the data buffer area in the request reception buffer 241 becomes free. The memory request management unit 203 secures the freed-up data buffer area in the request reception buffer 241. Thereafter, the memory request management unit 203 issues the generated multicast read request to the request reception buffer 241 to be stored in the secured data buffer area. When the acquisition of the request ID is completed by all the load/store units 22, the memory request management unit 203 may perform the processing while the order of the request IDs is ignored.

The memory request management unit 203 performs the following processing for the response with respect to the issued multicast read request. The memory request management unit 203 obtains the header of the memory read completion with respect to all the divided load instructions obtained by dividing the multicast load instruction from the completion transmission buffer 242 of the port 240 which will be described below.

Figure 7:
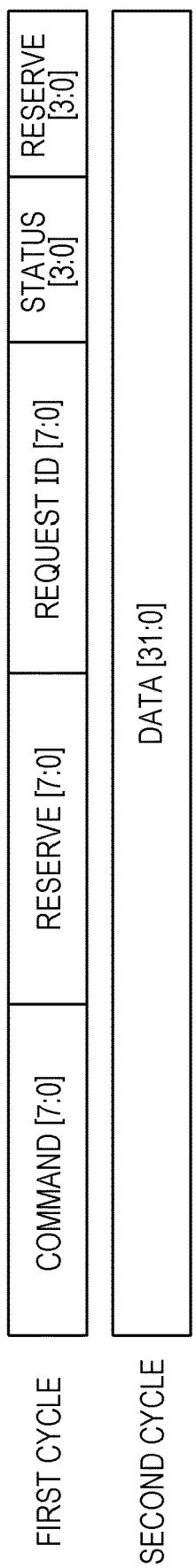
FIG. 7 illustrates an example of a format of a memory read completion.

FIG. 7 illustrates an example of a format of the memory read completion. The memory read completion obtained by the memory request management unit 203 illustrated in FIG. 4 has a format 303 illustrated in FIG. 7. The command indicating the type of the request, the request ID of the multicast read request corresponding to the response target, a status of the response, and a header having a reserve area are stored in the area transmitted in the first cycle in the memory read completion. The memory read data is stored in the area to be transmitted in the second cycle and thereafter in the memory read completion.

Referring again to FIG. 4, the memory request management unit 203 identifies the divided load instruction to which the request ID is assigned from the request IDs stored in the respective obtained memory read completions. Thereafter, the memory request management unit 203 outputs the information of the identified divided load instruction and the request ID assigned to the divided load instruction to the register control unit 204.

The data buffer 205 obtains the memory read data included in the memory read completion corresponding to the reply to the unicast read request or the multicast read request from the completion transmission buffer 242 to be stored.

The register control unit 204 receives the input of the information of all the divided load instructions from the instruction division unit 201 in the case of any one of the unicast load instruction and the multicast load instruction. Thereafter, the register control unit 204 receives the information of the divided load instruction where the memory read completion is returned and the input of the request ID assigned to the divided load instruction from the memory request management unit 203.

The register control unit 204 reads the memory read data corresponding to the data where the read is specified in the divided load instruction where the memory read completion is returned from the data buffer 205. The register control unit 204 decides a writing area of the register file 231 of the core 23. The register control unit 204 generates a write request for writing the obtained memory read data in the decided area in the register file 231 of the core 23. The register control unit 204 transmits the read memory read data to the register file 231 of the core 23 together with the write request.

Thereafter, the register control unit 204 releases the data buffer 205 that stores the memory read data. The register control unit 204 notifies the ID management unit 223 of the request ID assigned to the divided load instruction where the transmission of the memory read data is completed.

The register control unit 204 outputs the completion notification of the divided load instruction where the transmission of the memory read data is completed to the instruction division unit 201. Since, when the data is transmitted to the core 23, the data is to be processed thereafter for sure, the register control unit 204 may confirm the completion of the divided load instruction when the data transmission is used as a trigger without waiting for the response from the core 23.

The descriptions will continue with reference to FIG. 2 again. The MAC unit 24 includes the plurality of ports 240. The load/store units 22 are respectively connected to the respective ports 240. As illustrated in FIG. 4, the port 240 includes the request reception buffer 241 and the completion transmission buffer 242.

The number of requests that may be stored in the request reception buffer 241 is previously decided. For example, the request reception buffer 241 including storage areas for four requests may be referred to as the four-stage request reception buffer 241 in some cases. The request reception buffer 241 stores a memory access request transmitted from the memory request management unit 203 of the load/store unit 22. For example, the request reception buffer 241 stores the memory read request corresponding to the divided load instruction. In a case where the four requests are stored, the four-stage request reception buffer 241 does not accept a new request until at least one request is processed by the MAC unit 24. In a case where the stored request is processed by the MAC unit 24 and the area that stores the request becomes free, the request reception buffer 241 may store the new request in the freed-up area.

The completion transmission buffer 242 stores the memory read completion corresponding to the response to the memory access request. The number of memory read completions that may be stored in the completion transmission buffer 242 also has a restriction. With regard to the memory read completion stored in the completion transmission buffer 242, the header is obtained by the memory request management unit 203, and the memory read data is obtained by the data buffer 205. When the stored memory read completion is obtained by the load/store unit 22, the storage area of the obtained memory read completion becomes free, and the completion transmission buffer 242 may store a new memory read completion.

The MAC unit 24 obtains the memory access request stored in the request reception buffer 241 to be processed. For example, in a case where the memory access request is the memory read request, the MAC unit 24 reads the memory read data from the address of the memory 25 specified by the memory read request. The MAC unit 24 generates the memory read completion by using the read memory read data to be stored in the completion transmission buffer 242. Thereafter, the MAC unit 24 transmits the memory read completion stored in the completion transmission buffer 242 to the load/store unit 22. The MAC unit 24 corresponds to an example of a "memory controller".

The memory 25 functions as a storage device. Under the control of the MAC unit 24, the memory 25 performs the data read from the specified address and the data write with respect to the specified address. The memory 25 corresponds to an example of a "storage device".

Figure 8:
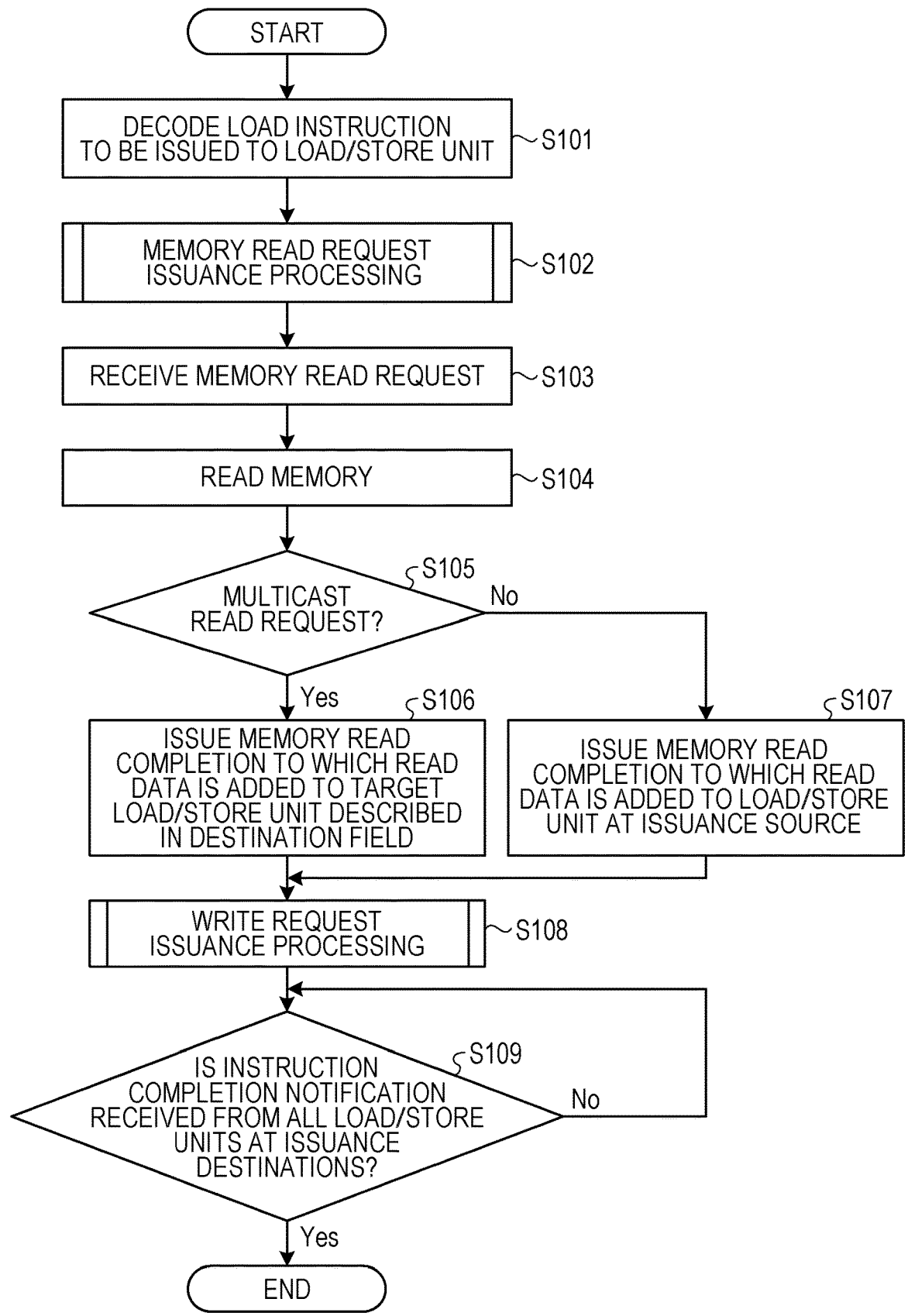
FIG. 8 is a flow chart of execution processing for the load instruction.

Next, a flow of the load instruction execution processing will be described with reference to FIGS. 4 and 8. FIG. 8 is a flow chart of execution processing for the load instruction.

The instruction unit 21 decodes the obtained load instruction to be issued to the load/store unit 22 (step S101). When the load instruction is the unicast load instruction, the instruction unit 21 issues the load instruction to the single load/store unit 22. When the load instruction is the multicast load instruction, the instruction unit 21 issues the load instruction to the plurality of target load/store units 22.

The load/store units 22 that have obtained the load instruction execute memory read request issuance processing (step S102).

The MAC unit 24 receives the memory read request from the load/store unit 22 connected to the port 240 (step S103) to be stored in the request reception buffer 241.

The MAC unit 24 obtains the memory read request stored in the request reception buffer 241 and executes memory reading in accordance with the obtained memory read request (step S104).

The MAC unit 24 determines whether or not the processed memory read request is the multicast read request (step S105). For example, the MAC unit 24 checks a destination field of the memory read request and determines that the processed memory read request is the multicast read request when the plural destinations are set.

In the case of the multicast read request (step S105: Yes), the MAC unit 24 issues the memory read completion to which the memory read data is added to each of the target load/store units 22 described in the destination field (step S106).

On the other hand, in the case of the unicast read request (step S105: No), the MAC unit 24 issues the memory read completion to which the memory read data is added to the load/store unit 22 at the issuance source described in the destination field (step S107).

The load/store unit 22 receives the memory read completion from the MAC unit 24 and executes write request issuance processing (step S108).

The instruction unit 21 determines whether or not the instruction completion notification is received from the load/store unit 22 at the issuance destination of the load instruction (step S109). When the load instruction is the multicast load instruction, the instruction unit 21 determines whether or not the instruction completion notification is received from all the target load/store units 22.

In a case where the load/store unit 22 corresponding to the issuance destination of the load instruction where the instruction completion notification is not received exists (step S109: No), the instruction unit 21 stands by until the instruction completion notification is received from the load/store unit 22 at the issuance destination of the load instruction.

In contrast to this, in a case where the instruction completion notification is received from the load/store unit 22 at the issuance destination of the load instruction (step S109: Yes), the instruction unit 21 completes the execution of the load instruction.

Figure 9:
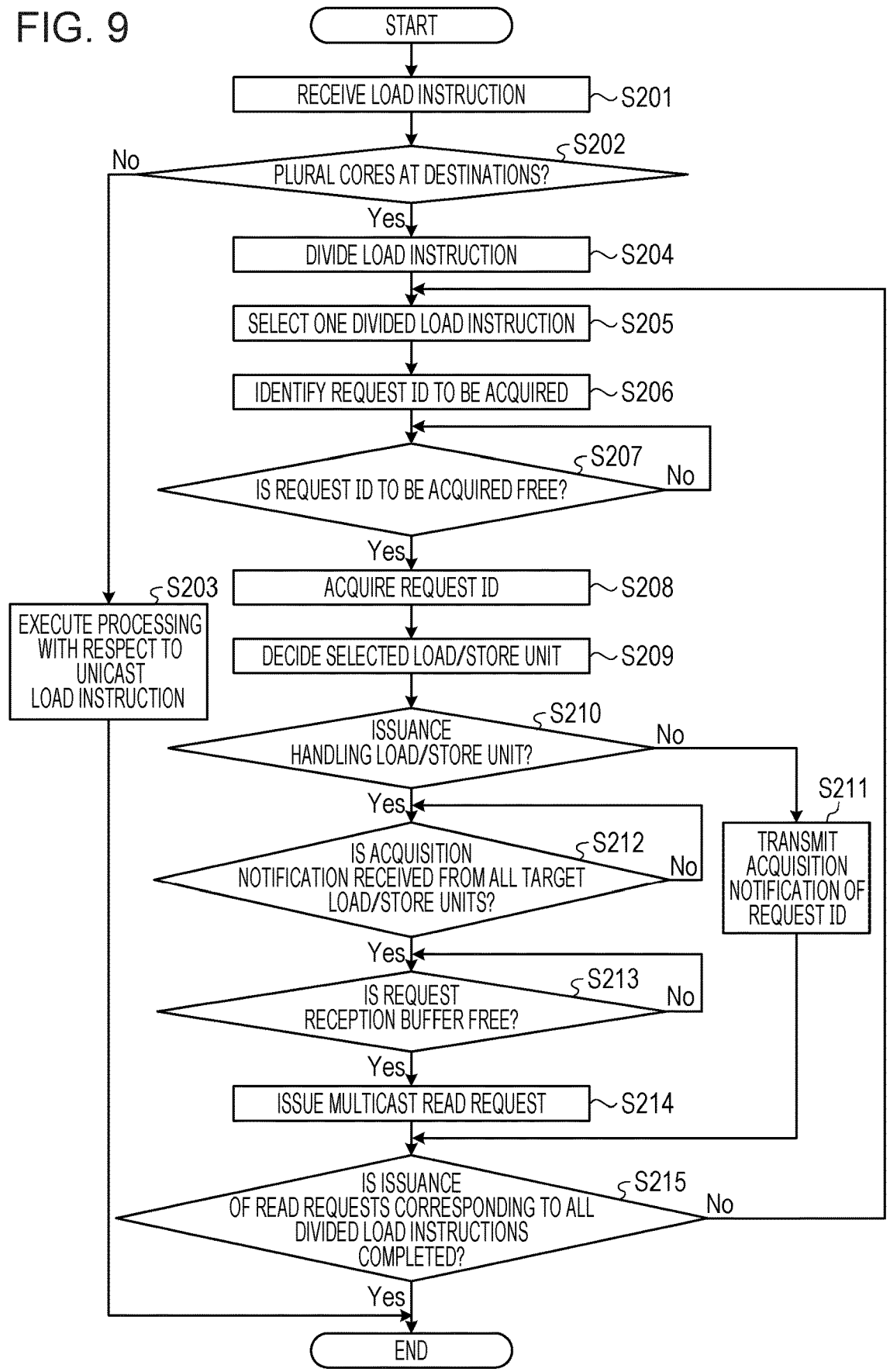
FIG. 9 is a flow chart of memory read request issuance processing.

Next, a flow of the memory read request issuance processing will be described with reference to FIGS. 4 and 9. FIG. 9 is a flow chart of the memory read request issuance processing. The flow chart represented by the flow chart of FIG. 9 corresponds to an example of processing executed in step S102 in FIG. 8.

The instruction division unit 201 receives the load instruction issued from the instruction unit 21 (step S201).

The instruction division unit 201 determines whether or not the plural cores 23 at the destination of the load instruction are set (step S202). In a case where the single core 23 at the destination is set (step S202: No), the instruction division unit 201 determines that the load instruction is the unicast load instruction. Thereafter, the instruction division unit 201, the request ID control unit 202, and the memory request management unit 203 execute the processing with respect to the unicast load instruction (step S203).

In contrast to this, the plural cores 23 at the destination are set (step S202: Yes), the instruction division unit 201 determines that the load instruction is the multicast load instruction. The instruction division unit 201 divides the load instruction to generate the divided load instruction (step S204).

The instruction division unit 201 selects one initial divided load instruction from the unselected divided load instructions among the divided load instructions (step S205). Hereinafter, the selected divided load instruction will be referred to as a "target divided load instruction".

The instruction division unit 201 instructs the multicast ID acquisition unit 222 to perform the notification of the information of the selected load/store unit 22 and also the acquisition of the request ID of the target divided load instruction. The multicast ID acquisition unit 222 identifies the request ID to be acquired by using the previously decided request ID decision logic in response to the instruction from the instruction division unit 201 (step S206).

The multicast ID acquisition unit 222 checks the ID management unit 223 as to whether or not the request ID to be acquired is free (step S207). In a case where the request ID to be acquired is not free (step S207: No), the multicast ID acquisition unit 222 stands by until the request ID to be acquired becomes free.

In contrast to this, in a case where the request ID to be acquired is free (step S207: Yes), the multicast ID acquisition unit 222 acquires the request ID (step S208). The multicast ID acquisition unit 222 notifies the memory request management unit 203 of the acquired request ID.

The decision unit 211 identifies the selected load/store unit 22 among the target load/store units 22 by using the previously decided issuance handling decision logic (step S209). The instruction division unit 201 outputs the target divided load instruction to the memory request management unit 203 together with the information of the selected load/store unit 22.

The decision unit 211 determines whether or not the load/store unit 22 in which its own unit is mounted is the selected load/store unit 22 to notify the multicast ID acquisition unit 222 (step S210).

In a case where the load/store unit 22 in which its own unit is mounted is not the selected load/store unit 22 (step S210: No), the multicast ID acquisition unit 222 transmits the acquisition notification of the request ID to the selected load/store unit 22 (step S211). The memory read request issuance processing proceeds to step S215.

On the other hand, in a case where the load/store unit 22 in which its own unit is mounted is the selected load/store unit 22 (step S210: Yes), the ID acquisition confirmation unit 224 determines whether or not the acquisition notification is received from all the target load/store units 22 (step S212). In a case where the target load/store unit 22 that has not received the acquisition notification exists (step S212: No), the ID acquisition confirmation unit 224 stands by until the acquisition notification is received from all the target load/store units 22.

In contrast to this, in a case where the acquisition notification is received from all the target load/store units 22 (step S212: Yes), the ID acquisition confirmation unit 224 notifies the memory request management unit 203 of the acquisition completion of the request ID by all the target load/store units 22. The memory request management unit 203 receives the notification of the acquisition completion of the request ID by all the target load/store units 22 and determines whether or not the request reception buffer 241 is free (step S213). In a case where the request reception buffer 241 is not free (step S213: No), the memory request management unit 203 stands by until the request reception buffer 241 becomes free.

In contrast to this, in a case where the request reception buffer 241 is free (step S213: Yes), the memory request management unit 203 issues the multicast read request (step S214).

The instruction division unit 201 determines whether or not the issuance of the read requests corresponding to all the divided load instructions is completed (step S215). In a case where the divided load instruction where the issuance of the read request is not performed exists (step S215: No), the instruction division unit 201 returns to step S205.

In contrast to this, in a case where the issuance of the read requests corresponding to all the divided load instructions is completed (step S215: Yes), the load/store unit 22 ends the memory read request issuance processing.

Figure 10:
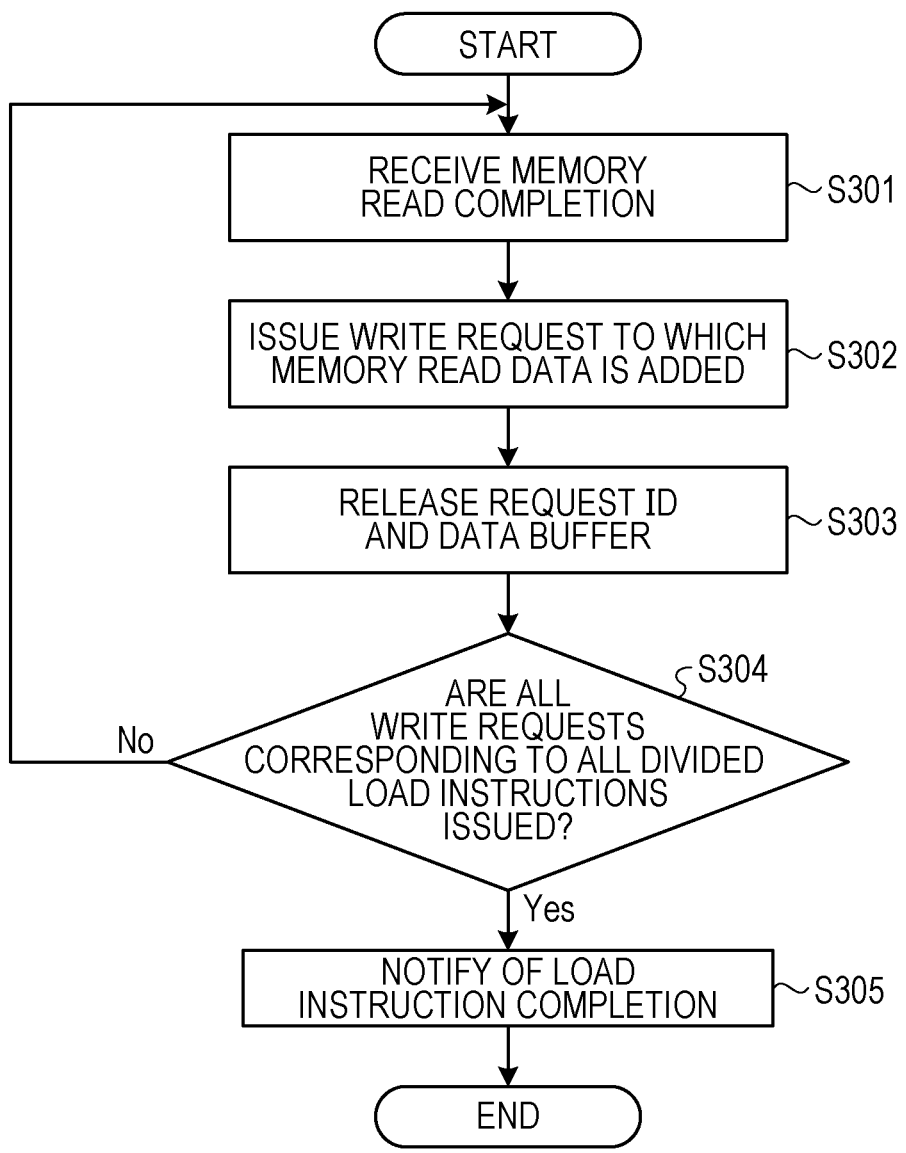
FIG. 10 is a flow chart of write request issuance processing.

Next, a flow of the write request issuance processing will be described with reference to FIGS. 4 and 10. FIG. 10 is a flow chart of the write request issuance processing. The processing represented by the flow chart of FIG. 10 is an example of the processing executed in step S108 in FIG. 8.

The load/store unit 22 receives the memory read completion from the completion transmission buffer 242 of the port 240 at the connection destination which the MAC unit 24 includes (step S301). The memory request management unit 203 obtains the header of the memory read completion. The memory read data added to the memory read completion is stored in the data buffer 205.

The memory request management unit 203 obtains the request ID stored in the header of the memory read completion and identifies the corresponding divided load instruction. The memory request management unit 203 outputs the information of the identified divided load instruction and the request ID corresponding to the divided load instruction to the register control unit 204. The register control unit 204 obtains the information of the divided load instruction where the memory read completion is received. The register control unit 204 issues the write request to which the read data is added to the register file 231 of the core 23 (step S302).

Thereafter, the register control unit 204 releases the data buffer 205 that stores the memory read data where the write request is performed and also releases the request ID by notifying the ID management unit 223 of the request ID assigned to the divided load instruction (step S303). The register control unit 204 notifies the instruction division unit 201 of the completion of the divided load instruction.

The register control unit 204 determines whether or not all the write requests corresponding to the respective divided load instructions generated by dividing the load instruction are issued (step S304). In a case where the divided load instruction where the corresponding write request is not issued exists (step S304: No), the write request issuance processing returns to step S301.

In contrast to this, in a case where the issuance of all the write requests corresponding to the respective divided load instructions is completed (step S304: Yes), the instruction division unit 201 receives the completion notification of all the divided load instructions generated by dividing the load instruction from the register control unit 204. The instruction division unit 201 notifies the instruction unit 21 of the completion of the load instruction (step S305).

Figure 12:
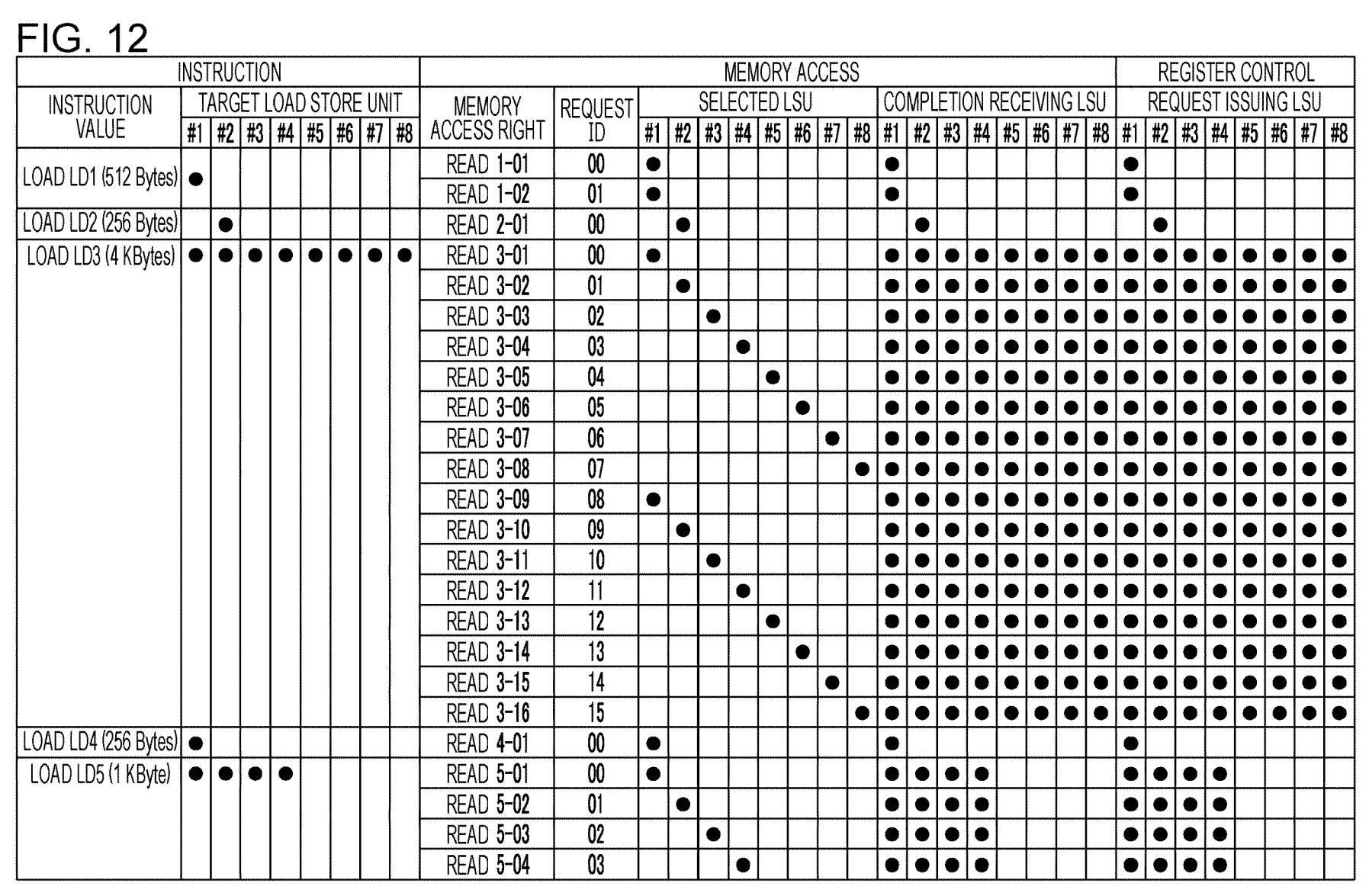

A comparison between a processing state of the multicast load instruction of the information processing apparatus 1 according to the present embodiment and a processing state of the multicast load instruction of the related-art information processing apparatus will be described with reference to, FIG. 4, FIG. 11 and FIG. 12. FIG. 11 illustrates the processing state of the multicast load instruction of the related-art information processing apparatus. FIG. 12 illustrates the processing state of the multicast load instruction the information processing apparatus according to the first embodiment.

The load/store units #1 to #8 exist as the load/store units 22. Loads LD1 to LD5 are issued as the load instructions. The load LD1 is the unicast load instruction which is divided into two divided load instructions and also in which the load/store unit #1 is the transmission destination, and the unicast read request corresponds to reads 1-01 and 1-02. The load LD2 is the unicast load instruction which is divided into the single divided load instruction and also in which the load/store unit #2 is the transmission destination, and the unicast read request corresponds to a read 2-01. The load LD3 is the multicast load instruction which is divided into 16 divided load instructions and also in which the load/store units #1 to #8 correspond to the transmission destinations, and the multicast read request corresponds to reads 3-01 to 3-16. The load LD4 is the unicast load instruction which is divided into the single divided load instruction and also in which the load/store unit #1 corresponds to the transmission destination, and the unicast read request corresponds to a read 4-01. The load LD5 is the multicast load instruction which is divided into four divided load instructions and also in which the load/store units #1 to #4 correspond to the transmission destination, and the multicast read request corresponds to reads 5-01 to 5-04. A case will be described where 00 to 15 are used as the request IDs.

In the related-art information processing apparatus, the particular load/store unit 22 is selected as the load/store unit 22 that issues the multicast read request. For this reason, a state illustrated in FIG. 11 is established in the related-art information processing apparatus.

With regard to the load LD1, since the transmission destination is the load/store unit #1, the unicast read request issues the load/store unit #1. 00 and 01 are assigned to these unicast read requests as the request IDs, both of the unicast read requests are stored in the request reception buffer 241 corresponding to the load/store unit #1. In this case, the load/store unit #1 performs the reception of the memory read completion and the issuance of the write request.

The load LD2 is to be processed, and in this case, the read 1-01 has been already processed. Since the request ID 00 is free, 00 is assigned to the read 2-01 as the request ID. In this case, the load/store unit #2 issues the unicast read request. This unicast read request is stored in the request reception buffer 241 corresponding to the load/store unit #2. In this case, the load/store unit #2 performs the reception of the memory read completion and the issuance of the write request.

The load LD3 is to be processed, and this is the case of the multicast load instruction. As illustrated in FIG. 11, the load/store unit #1 representatively performs the issuance of all the reads 3-01 to 3-16. In this case, all the reads 3-01 to 3-16 are stored in the request reception buffer 241 corresponding to the load/store unit #1. For this reason, it is considerable that free space in the request reception buffer 241 disappears, and in the above-mentioned case, a delay is caused to wait until the request reception buffer 241 becomes free. To issue the request ID to the reads 3-01 to 3-16, the process waits until both the loads LD1 and LD2 complete, and the delay is caused for this reason. In this case, the load/store units #1 to #8 perform the reception of the memory read completion and the issuance of the write request.

The load LD4 is to be processed, and in this case, a probability that the read 3-01 has been already processed is high. When the request ID 00 is free, 00 is assigned to the read 4-01 as the request ID. In this case, the load/store unit #1 issues the unicast read request. This unicast read request is stored in the request reception buffer 241 corresponding to the load/store unit #1. In this case, the load/store unit #1 performs the reception of the memory read completion and the issuance of the write request.

The load LD5 is to be processed, and this is the case of the multicast load instruction. As illustrated in FIG. 11, the load/store unit #1 representatively performs the issuance of all the reads 5-01 to 5-04 corresponding to the multicast read requests. In this case, all the reads 5-01 to 5-04 are stored in the request reception buffer 241 corresponding to the load/store unit #1. For this reason, it is conceivable that free space in the request reception buffer 241 disappears, and in the above-mentioned case, a delay is caused to wait until the request reception buffer 241 becomes free. To issue the request ID to the reads 5-01 to 5-04, the process waits until the load LD3 completes, and the delay is caused for this reason. In this case, the load/store units #1 to #4 perform the reception of the memory read completion and the issuance of the write request.

In this manner, in the related-art information processing apparatus, there is a fear that much delay may be caused at the time of the obtainment of the request ID and the storage into the request reception buffer 241.

In contrast to this, the processing of the loads LD1 and LD2 in the information processing apparatus 1 according to the present embodiment are the same as the related art, but the processing of the load LD3 is different from the related art. First, the request IDs are decided with respect to the reads 3-01 to 3-16 when 00 to 15 are respectively acquired. When the request IDs are acquired in all the load/store units #1 to #8 without waiting for the release of all of the request IDs, the acquisition of the request IDs is completed.

As illustrated in FIG. 12, the load/store unit #1 issues the read 3-01. The load/store unit #2 issues the read 3-02. The load/store unit #3 issues the read 3-03. The load/store unit #4 issues the read 3-04. The load/store unit #5 issues the read 3-05. The load/store unit #6 issues the read 3-06. The load/store unit #7 issues the read 3-07. The load/store unit #8 issues the read 3-08. The load/store unit #1 issues the read 3-09. The load/store unit #2 issues the read 3-10. The load/store unit #3 issues the read 3-11. The load/store unit #4 issues the read 3-12. The load/store unit #5 issues the read 3-13. The load/store unit #6 issues the read 3-14. The load/store unit #7 issues the read 3-15. The load/store unit #8 issues the read 3-16.

That is, for example, the reads 3-01 and 3-09 are stored in the request reception buffer 241 corresponding to the load/store unit #1. The reads 3-02 and 3-10 are stored in the request reception buffer 241 corresponding to the load/store unit #2. The reads 3-03 and 3-11 are stored in the request reception buffer 241 corresponding to the load/store unit #3. The reads 3-04 and 3-12 are stored in the request reception buffer 241 corresponding to the load/store unit #4. The reads 3-05 and 3-13 are stored in the request reception buffer 241 corresponding to the load/store unit #5. The reads 3-06 and 3-15 are stored in the request reception buffer 241 corresponding to the load/store unit #6. The reads 3-07 and 3-15 are stored in the request reception buffer 241 corresponding to the load/store unit #7. The reads 3-08 and 3-16 are stored in the request reception buffer 241 corresponding to the load/store unit #8.

Therefore, in the processing of the load LD3, the request reception buffer 241 that stores the multicast read request is dispersed, and each of the request reception buffers 241 becomes immediately free. For this reason, the occurrence of the delay for waiting for the request reception buffer 241 to be free may be alleviated.

Subsequently, the processing of the load LD4 is executed similarly as in the related art. In the processing of the load LD5, the request IDs are decided when 00 to 03 are respectively acquired with respect to the reads 5-01 to 5-04. The acquisition of the request IDs is completed when all the load/store units #1 to #4 acquire the request ID without waiting for the release of all of the request IDs.

As illustrated in FIG. 12, the load/store unit #1 issues the read 5-01. The load/store unit #2 issues the read 5-02. The load/store unit #3 issues the read 5-03. The load/store unit #4 issues the read 5-04.

That is, for example, the read 5-01 is stored in the request reception buffer 241 corresponding to the load/store unit #1. The read 5-02 is stored in the request reception buffer 241 corresponding to the load/store unit #2. The read 5-03 is stored in the request reception buffer 241 corresponding to the load/store unit #3. The read 5-04 is stored in the request reception buffer 241 corresponding to the load/store unit #4.

Therefore, in the processing of the load LD5 too, the request reception buffer 241 that stores the multicast read request is dispersed, and each of the request reception buffers 241 becomes immediately free. For this reason, the occurrence of the delay for waiting for the request reception buffer 241 to be free may be alleviated.

As described above, the information processing apparatus according to the present embodiment selects the unified load/store unit in all the load/store units to which the multicast load instruction has been transmitted as an issuance handling unit in charge of issuance for each of the divided load instructions obtained by dividing the multicast load instruction. The load/store unit serving as the issuance handling unit is changed for each divided instruction. The information processing apparatus according to the present embodiment acquires the unified request ID in all the load/store units to which the multicast load instruction has been transmitted for each of the divided load instructions obtained by dividing the multicast load instruction. In a case where all the load/store units to which the multicast load instruction has been transmitted acquire the request ID, the multicast read request is issued from the load/store unit serving as the issuance handling unit.

With this configuration, since the load/store unit that issues the multicast read request is changed for each divided load instruction, the processing for issuing the multicast read request is dispersed among the load/store units. Therefore, a bias in the storage of the multicast read request may be alleviated with respect to the particular request reception buffer, and the throughput of the memory data transfer may be improved.

When the particular request ID alone is freed up, since the multicast read request of the divided load instruction to which the request ID is assigned may be issued, the multicast read request may be issued without waiting for the release of all of the request IDs. Therefore, the time spent for the issuance of the multicast read request may be shortened, and the throughput of the memory data transfer may be improved.

In this manner, the throughput of the memory data transfer may be improved due to the dispersion of the issuance handling of the multicast read request and the shortening of the time until the issuance of the multicast read request, and the processing performance of the information processing apparatus is improved as a result. In particular, for example, in a case where computation including a number of calculations using the same data such as a matrix operation is executed, the multicast load instruction for causing a plurality of cores to read the same data is issued in many cases. For this reason, in a case where the information processing apparatus performs the computation including a number of calculations using the same data such as the matrix operation, the improvement in the processing performance is expected, in particular, for example.

Second Embodiment

Figure 13:
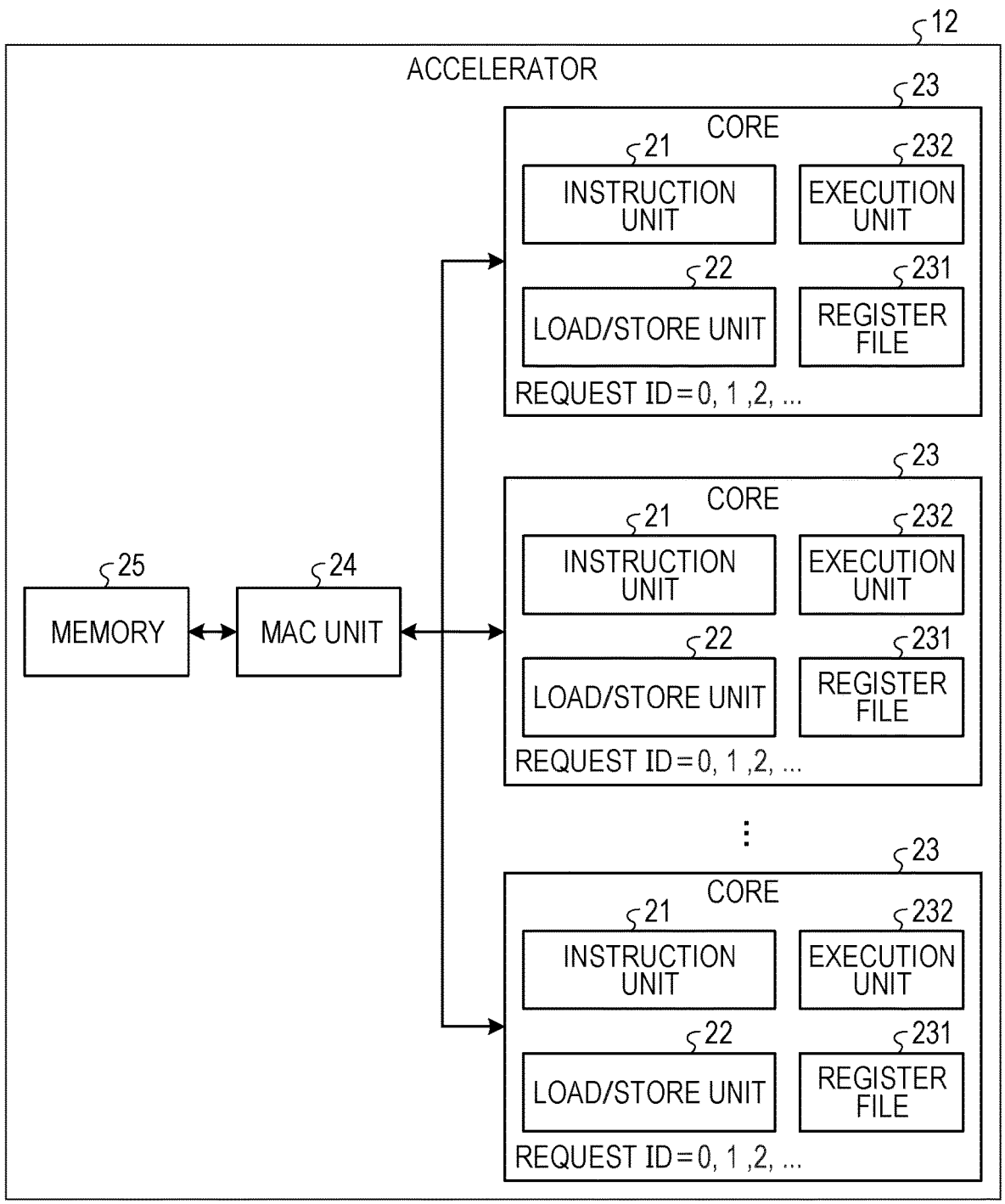
FIG. 13 is a block diagram of an accelerator according to a second embodiment.

FIG. 13 is a block diagram of an accelerator according to a second embodiment. A difference from the first embodiment resides in that the instruction unit 21 and the load/store unit 22 are mounted within the core 23 in the accelerator 12 according to the present embodiment. In the following descriptions, the respective units similar to those of the first embodiment have the similar functions unless stated otherwise.

In the accelerator 12 according to the present embodiment, each of the instruction units 21 mounted in the respective cores 23 obtains the multicast load instruction in a case where the core 23 in which its own unit is mounted is set as the destination of the data. The instruction unit 21 issues the decoded multicast load instruction to the load/store unit 22 mounted to the same core 23 where its own unit is also mounted.

The block diagram of the load/store unit 22 according to the present embodiment is also illustrated in FIG. 4. The decision unit 211 decides the selected load/store unit 22 in accordance with the previously decided issuance handling decision logic for each divided load instruction while the load/store unit 22 mounted to the core 23 set as the destination of the data is set as the target load/store unit 22. The multicast ID acquisition unit 222 decides the request ID in accordance with the previously decided request ID decision logic. The request IDs denoted below the respective load/store units 22 represent that each of the load/store units 22 decides the number in the order from the left of the numbers arranged with respect to the respective divided load instructions as the request ID.

The multicast ID acquisition unit 222 performs the acquisition of the decided request ID and notifies the selected load/store unit 22 of the acquisition of the request ID when the load/store unit 22 in which its own unit is mounted is not the selected load/store unit 22. The memory request management unit 203 of the selected load/store unit 22 issues the multicast read request when the request ID is secured in all the target load/store units 22 and the request reception buffer 241 is free. In this manner, the target load/store unit 22 processes the multicast load instruction.

As described above, in the information processing apparatus according to the present embodiment too, the processing for issuing the multicast read request is dispersed among the load/store units, and the bias of the storage of the multicast read request with respect to the particular request reception buffer may be alleviated. When the particular request ID alone is freed up, since the multicast read request of the divided load instruction to which the request ID is assigned may be issued, the multicast read request may be issued without waiting for the release of all of the request IDs.

Therefore, even in a case where the respective cores include both the instruction unit and the load/store unit as in the information processing apparatus according to the present embodiment, the processing performance of the information processing apparatus may be improved.

Third Embodiment

Figure 14:
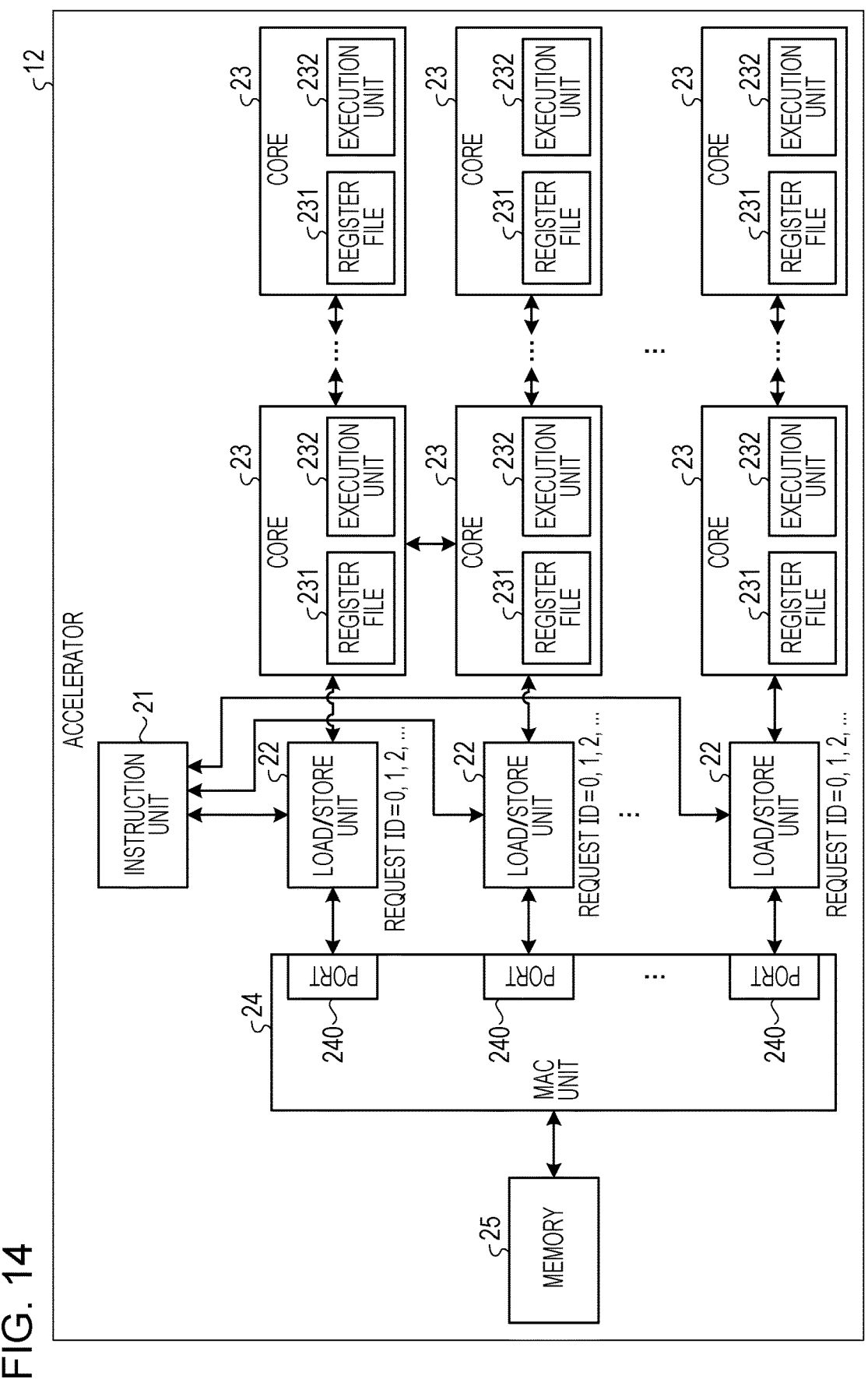
FIG. 14 is a block diagram of an accelerator according to a third embodiment.

FIG. 14 is a block diagram of an accelerator according to a third embodiment. A difference from the first embodiment resides in that with the plurality of cores 23 are connected to the single load/store unit 22 in a row in the accelerator 12 according to the present embodiment. In the following descriptions, the respective units similar to those of the first embodiment have the similar functions unless stated otherwise.

Some of the cores 23 are connected to the load/store unit 22 in the information processing apparatus 1 according to the present embodiment. That is, for example, the load/store unit 22 is associated with one of the plurality of cores 23.

The information processing apparatus 1 according to the present embodiment selects the plurality of cores 23 from among the cores 23 connected to the respective load/store units 22 as the destinations of the data in the multicast load instruction. The load/store unit 22 to which the core 23 selected as the destination is not connected may also be arranged. The single core 23 selected as the destination or the plurality of cores 23 selected as the destinations may be connected to the load/store unit 22.

The instruction unit 21 issues the decoded multicast load instruction to the load/store unit 22 to which the core 23 set as the destination of the data of the multicast load instruction is connected.

The block diagram of the load/store unit 22 according to the present embodiment is also illustrated in FIG. 4. The decision unit 211 decides the selected load/store unit 22 in accordance with the previously decided issuance handling decision logic for each divided load instruction while the load/store unit 22 to which the core 23 set as the destination of the data is connected is set as the target load/store unit 22. The multicast ID acquisition unit 222 decides the request ID in accordance with the previously decided request ID decision logic. The request IDs denoted below the respective load/store units 22 represent that each of the load/store units 22 decides the number in the order from the left of the numbers arranged with respect to the respective divided load instructions as the request ID.

The multicast ID acquisition unit 222 performs the acquisition of the decided request ID. The multicast ID acquisition unit 222 of the load/store unit 22 other than the selected load/store unit 22 notifies the selected load/store unit 22 of the acquisition of the request ID. The memory request management unit 203 of the selected load/store unit 22 issues the multicast read request when the request ID is secured in all the target load/store units 22 and the request reception buffer 241 is free.

In the case of the load/store unit 22 to which the plurality of cores 23 set as the destinations of the data are connected in the multicast load instruction, the memory request management unit 203 receives the memory read completion where the plurality of cores 23 are set as the destinations. The register control unit 204 transmits the write request together with the memory read data towards the core 23 connected to the load/store unit 22 in which its own unit is mounted among the destinations registered in the memory read completion.

As described above, in the information processing apparatus according to the present embodiment too, the processing for issuing the multicast read request is dispersed among the load/store units, and the bias of the storage of the multicast read request with respect to the particular request reception buffer may be alleviated. When the particular request ID alone is freed up, since the multicast read request of the divided load instruction to which the request ID is assigned may be issued, the multicast read request may be issued without waiting for the release of all of the request IDs.

Therefore, even in a case where the plurality of cores are connected to the single load/store unit as in the information processing apparatus according to the present embodiment, the processing performance of the information processing apparatus may be improved.

According to the above-mentioned respective embodiments, the data reading among the load/store unit 22, the core 23, and the memory 25 mounted to the accelerator 12 has been described as an example, but a similar function may be applied to an apparatus in which a plurality of arithmetic processing apparatuses read the same data from a storage device. For example, the above-mentioned function may also be applied to the data read between the CPU core of the CPU 10 in the information processing apparatus 1 illustrated in FIG. 1 and the load/store unit and the memory 15. In the above-mentioned case, the CPU 10 corresponds to an example of the arithmetic processing apparatus, the CPU core corresponds to an example of the arithmetic processing unit, and the load/store unit of the CPU 10 corresponds to an example of the "access circuit".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory;
a plurality of arithmetic processors each configured to perform computation on data obtained from the memory;
a memory controller configured to control a load instruction that reads, from the memory, data to be obtained by a corresponding arithmetic processor; and
a plurality of access circuits respectively corresponding to the plurality of arithmetic processors, an access circuit of the plurality of access circuits being configured to:
generate a plurality of divided instructions by dividing a multicast load instruction that reads, from the memory, data to be obtained by a predetermined number of target arithmetic processors among the plurality of arithmetic processors,
select, for each of the plurality of divided instructions, from among target access circuits corresponding to the predetermined number of target access arithmetic processors, a first access circuit that issues, to the memory controller, a read request for causing the target access circuits to perform responses to the predetermined number of target access arithmetic processors,
when the access circuit is the first access circuit, determine, from among pieces of identification information, first identification information that is common to all of the target access circuits, and issue, to the memory controller, a single read request to which the first identification information is added, and
obtain, from the memory controller, a plurality of responses to which the first identification information is added, and output first data based on the obtained plurality of responses to the target arithmetic processors corresponding to the access circuit.

2. The information processing apparatus of claim 1, wherein, in a state where the access circuit different from the first access circuit is using the first identification information and the first identification information is unavailable, when the single read request to which the first identification information is added is completed, the access circuit sets the first identification information to be available by transmitting, to the first access circuit, a first notification indicating that the first identification information is available.

3. The information processing apparatus of claim 2, wherein, when the first notification for the first identification information is obtained from the access circuit different from the first access circuit, the first access circuit allocates, to all of the plurality of divided instructions, the first identification information that has become available.

4. The information processing apparatus of claim 1, further comprising: an instruction output circuit configured to identify, based on the multicast load instruction, the target access circuits corresponding the predetermined number of target access arithmetic processors, and outputs the multicast load instruction to the identified target access circuits.

5. The information processing apparatus of claim 1, wherein each of the plurality of arithmetic processors includes:
a second memory that stores the first data output by the corresponding access circuit, and
an execution circuit that performs computation by using the first data stored in the second memory.

6. The information processing apparatus of claim 1, wherein each of the plurality of access circuits is configured to determine whether each piece of the identification information is currently used.

7. The information processing apparatus of claim 1, wherein each of the plurality of access circuits is associated with one or more arithmetic processors among the plurality of arithmetic processors.

8. The information processing apparatus of claim 4, wherein,
when the access circuit has obtained, from the memory controller, for all of the plurality of divided instructions, the plurality of responses to which the first identification information with respect to the single read request is added, and has outputted data based on the obtained plurality of responses, to the predetermined number of target arithmetic processors corresponding to the target access circuits, the access circuit notifies the instruction output circuit of a completion notification indicating that the multicast load instruction is completed.

9. An arithmetic processing apparatus comprising:
a plurality of arithmetic processors each configured to perform computation on data obtained from a memory;
a memory controller configured to control a load instruction that reads, from the memory, data to be obtained by the corresponding arithmetic processor; and
a plurality of access circuits respectively corresponding to the plurality of arithmetic processors, an access circuit of the plurality of access circuits being configured to:
generate a plurality of divided instructions by dividing a multicast load instruction that reads, from the memory, data to be obtained by a predetermined number of target arithmetic processors among the plurality of arithmetic processors,
select, for each of the plurality of divided instructions, from among target access circuits corresponding to the predetermined number of target access arithmetic processors, a first access circuit that issues, to the memory controller, a read request for causing the target access circuits to perform responses to the predetermined number of target access arithmetic processors,
when the access circuit is the first access circuit, determine, from among pieces of identification information, first identification information that is common to all of the target access circuits, and issue, to the memory controller, a single read request to which the first identification information is added, and
obtain, from the memory controller, a plurality of responses to which the first identification information is added, and output first data based on the obtained plurality of responses to the target arithmetic processors corresponding to the access circuit.

10. A control method of controlling an information processing apparatus comprising:
causing an access circuit of a plurality of access circuits to:
generate a plurality of divided instructions by dividing a multicast load instruction that reads, from a memory, data to be obtained by a predetermined number of target arithmetic processors among a plurality of arithmetic processors,
select, for each of the plurality of divided instructions, from among target access circuits corresponding to the predetermined number of target access arithmetic processors, a first access circuit that issues, to a memory controller configured to control a load instruction for reading data to be obtained by a corresponding arithmetic processor from the memory, a read request for causing the target access circuits to perform responses to the predetermined number of target access arithmetic processors,
when the access circuit is the first access circuit, determine, from among pieces of identification information, first identification information that is common to all of the target access circuits, and issue, to the memory controller, a single read request to which the first identification information is added, and
obtain, from the memory controller, a plurality of responses to which the first identification information is added, and output first data based on the obtained plurality of responses to the target arithmetic processors corresponding to the access circuit.

* * * * *